(12) United States Patent
Lee et al.

(10) Patent No.: US 9,329,674 B2
(45) Date of Patent: May 3, 2016

(54) DISPLAY DEVICE WITH INTEGRATED TOUCH SCREEN

(71) Applicant: LG Display Co., Ltd., Seoul (KE)

(72) Inventors: Young Joon Lee, Gyeonggi-do (KR); Sun Yeop Kim, Gyeonggi-do (KR); Sung Yub Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 378 days.

(21) Appl. No.: 13/676,333

(22) Filed: Nov. 14, 2012

(65) Prior Publication Data

US 2013/0335343 A1    Dec. 19, 2013

(30) Foreign Application Priority Data

Jun. 14, 2012    (KR) .................. 10-2012-0063594

(51) Int. Cl.
  *G06F 3/041*   (2006.01)
  *G06F 3/01*   (2006.01)
(52) U.S. Cl.
  CPC ............... *G06F 3/01* (2013.01); *G06F 3/0412* (2013.01)
(58) Field of Classification Search
  None
  See application file for complete search history.

(56) References Cited

U.S. PATENT DOCUMENTS

| | | | |
|---|---|---|---|
| 7,859,521 B2 | 12/2010 | Hotelling et al. | |
| 8,654,083 B2 * | 2/2014 | Hotelling et al. | ............. 345/173 |
| 2008/0048994 A1 * | 2/2008 | Lee et al. | ................ 345/173 |
| 2008/0136804 A1 | 6/2008 | Lee | |
| 2010/0271327 A1 | 10/2010 | Shin et al. | |
| 2011/0148846 A1 * | 6/2011 | Arasawa et al. | ............. 345/212 |
| 2011/0242050 A1 * | 10/2011 | Byun et al. | ................ 345/174 |
| 2011/0261004 A1 | 10/2011 | Chen et al. | |
| 2011/0316809 A1 | 12/2011 | Kim et al. | |
| 2012/0287081 A1 * | 11/2012 | Akai et al. | ................ 345/174 |
| 2013/0147724 A1 * | 6/2013 | Hwang et al. | ................ 345/173 |
| 2013/0215075 A1 * | 8/2013 | LEE et al. | ................ 345/174 |
| 2013/0335343 A1 | 12/2013 | Lee et al. | |

FOREIGN PATENT DOCUMENTS

| | | |
|---|---|---|
| CN | 102073402 A | 5/2011 |
| CN | 102298473 A | 12/2011 |

OTHER PUBLICATIONS

USPTO Office Action dated Aug. 13, 2014 in related technology U.S. Appl. No. 13/675,320.

(Continued)

*Primary Examiner* — Adam R Giesy
*Assistant Examiner* — Henok Heyi
(74) *Attorney, Agent, or Firm* — Morgan, Lewis & Bockius LLP

(57) ABSTRACT

A display device with integrated touch screen is provided. The display device may include a panel, a display driver IC, and a touch IC. The panel may include a plurality of driving electrodes and sensing electrodes. The display driver IC may apply a driving pulse to the driving electrodes and receive a plurality of sensing signals from the sensing electrodes when the panel operates in a touch driving mode, and, when the panel operates in a display driving mode, the display driver IC may apply a common voltage to the driving electrodes and sensing electrodes. The touch IC may generate the driving pulse and apply the driving pulse to the display driver IC, and may receive the sensing signals from the display driver IC to determine whether there is a touch. The touch IC may include a sensing unit sensing whether there is a touch.

20 Claims, 7 Drawing Sheets

(56) References Cited

OTHER PUBLICATIONS

USPTO Office Action dated Nov. 25, 2014 in related technology U.S. Appl. No. 13/675,320.

First Office Action dated Oct. 29, 2015 from The State Intellectual Property Office of the People's Republic of China in counterpart Chinese application No. 201210484209.0.

* cited by examiner

DISPLAY DEVICE WITH INTEGRATED TOUCH SCREEN

CROSS-REFERENCE TO RELATED APPLICATIONS

This application claims the benefit of the Korean Patent Application No. 10-2012-0063594 filed on Jun. 14, 2012, which is hereby incorporated by reference as if fully set forth herein.

BACKGROUND

1. Field of the Disclosure

Embodiments of the present invention relate to a display device, and more particularly, to a display device with an integrated in-cell type touch screen.

2. Discussion of the Related Art

Touch screens are a type of input device that may be included in display devices such as Liquid Crystal Displays (LCDs), Field Emission Displays (FEDs), Plasma Display Panel (PDPs), Electroluminescent Displays (ELDs), and Electrophoretic Display (EPDs), and may enable a user to input information by directly touching a screen with a finger, a pen or the like while looking at the screen of the display device.

Particularly, the demand of display devices with an integrated in-cell type touch screen, which may include a plurality of built-in elements configuring the touch screen, is recently increasing. Such display devices may be used in slim-profile portable terminals such as smart phones and tablet Personal Computers (PCs).

In a related art display device with an integrated in-cell type touch screen disclosed in U.S. Pat. No. 7,859,521, a plurality of common electrodes for a display are segmented into a plurality of touch driving areas and touch sensing areas, thereby allowing a mutual capacitance to be generated between the touch driving area and the touch sensing area. Therefore, the related art display device measures the change of a mutual capacitance that occurs from a touch, and thus determines whether there is a touch.

In other words, in the related art display device with an integrated in-cell type touch screen, a plurality of common electrodes for the display perform the function of a touch electrode when a panel operates in a touch driving mode. This allows the display device to simultaneously perform a display function and a touch function.

In a related art in-cell type mutual capacitive touch screen using the existing common electrodes, a scheme that uses a plurality of driving electrodes and sensing electrodes necessary for touch driving temporally separates a display driving mode session and a touch driving mode session by using a common electrode, and thus prevents a noise ingredient (which occurs in the display driving mode session) from affecting the touch driving.

In the display driving mode session, a driving electrode and a sensing electrode act as common electrodes. In the touch driving mode session, a periodic driving pulse is applied to a driving electrode, and a touch integrated circuit (IC) determines whether there is a touch by using a touch sensing signal that is generated between a sensing electrode and the driving electrode according to the driving pulse applied to the driving electrode.

Specifically, a ground voltage applied to the touch IC is used as the low-level voltage of the driving pulse applied to the driving electrode. Also, an arbitrary direct current (DC) voltage instead of a ground voltage is applied to a receiver of the touch IC connected to a sensing electrode for detecting the signal of the sensing electrode.

FIG. 1 is a timing chart showing voltages which may be respectively applied to a driving electrode and sensing electrode of a related art display device with an integrated touch screen.

For example, as shown in FIG. 1, in a display driving mode session, a common voltage Z(V) may be applied to both the driving electrode TX and the sensing electrode RX, and thus, an equal voltage may be generated between the driving electrode and the sensing electrode, whereby an image-quality defect such as block dimming caused due to a luminance difference between the electrodes may be avoided.

However, in a touch driving mode session, a driving pulse where X(V) may be a high-level voltage and a ground voltage may be a low-level voltage may be applied to the driving electrode TX, and a touch sensing reference voltage Y(V) that may be a constant DC voltage may be applied to a receiver of a touch IC connected to the sensing electrode RX.

Here, as shown in FIG. 1, the driving pulse may be applied to the driving electrode in only part of a session, and the ground voltage that may be the low-level voltage may be applied to the driving electrode in most of a session.

Therefore, a difference between voltages respectively applied to the driving electrode and the sensing electrode may occur in the touch driving mode session, and thus, different voltages may be applied to a common electrode block that is used as a driving electrode and a common electrode block that is used as a sensing electrode in the touch driving mode session. This may cause block dimming in which a luminance difference occurs between blocks in a panel.

Moreover, as shown in FIG. 1, the common voltage Z(V) may be applied to the driving electrode and the sensing electrode in the display driving mode session, but in the touch driving mode session, the ground voltage (which may have a level different from that of the common voltage) may be applied to the driving electrode, and the touch sensing reference voltage Y(V) may be applied to the sensing electrode, thereby causing flickers due to a voltage difference between the display driving mode session and the touch driving mode session.

SUMMARY

Accordingly, embodiments of the present invention are directed to providing a display device with an integrated in-cell type touch screen that substantially obviates one or more problems due to limitations and disadvantages of the related art.

An aspect of embodiments of the present invention is directed to providing a display device with an integrated touch screen that can prevent block dimming and flickers due to a difference between voltages respectively applied to a driving electrode and a sensing electrode.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there may be provided a display device with integrated touch screen including a panel including a plurality of driving electrodes and sensing electrodes; a display driver integrated circuit (IC) applying a driving pulse to the driving electrodes and receiving a plurality of sensing signals from the sensing electrodes when the panel operates in a touch driving mode and, when the panel operates in a display driving mode, applying a common voltage to the plurality of driving electrodes and sensing electrodes; and a touch IC generating the driving pulse, applying the driving pulse to the display driver IC, and receiving the sensing signals from the display driver IC to determine whether there is a touch, wherein the touch IC may include a sensing unit sensing whether there is a touch by use of a touch sensing reference voltage applied to the sensing unit and having the same level as a minimum voltage of the driving pulse.

In another aspect of an embodiment of the present invention, there is provided a method of driving a display device with an integrated touch screen, the touch screen including a display driver IC, a touch IC, and a panel having a plurality of driving electrodes and sensing electrodes, where the method may include while the panel operates in a touch driving mode, the display driver IC applying a driving pulse to the driving electrodes and receiving a plurality of sensing signals from the sensing electrodes, and the touch IC receiving the plurality of sensing signals from the display driver IC and determining whether there is a touch; and while the panel operates in a display driving mode, the display driver IC applying a common voltage to the plurality of driving electrodes and sensing electrodes, wherein the touch IC may be configured to sense whether there is a touch by use of a touch sensing reference voltage having the same level as a minimum voltage of the driving pulse.

It is to be understood that both the foregoing general description and the following detailed description of embodiments of the present invention are exemplary and explanatory and are intended to provide further explanation of the embodiments of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of embodiments of the invention. In the drawings.

DETAILED DESCRIPTION

Reference will now be made in detail to the exemplary embodiments of the present invention, examples of which are illustrated in the accompanying drawings. The same reference numbers may be used throughout the drawings to refer to the same or like parts.

Hereinafter, embodiments of the present invention will be described in detail with reference to the accompanying drawings.

In the following description, for brevity, a display device with an integrated touch screen according to embodiments of the present invention will be exemplarily described as being an LCD device, but embodiments of the present invention are not limited thereto. Embodiments of the present invention may be applied to various display devices such as, for example, FEDs, PDPs, ELDs, and EPDs. A description of the general configuration of an LCD device is not provided.

Figure 1:
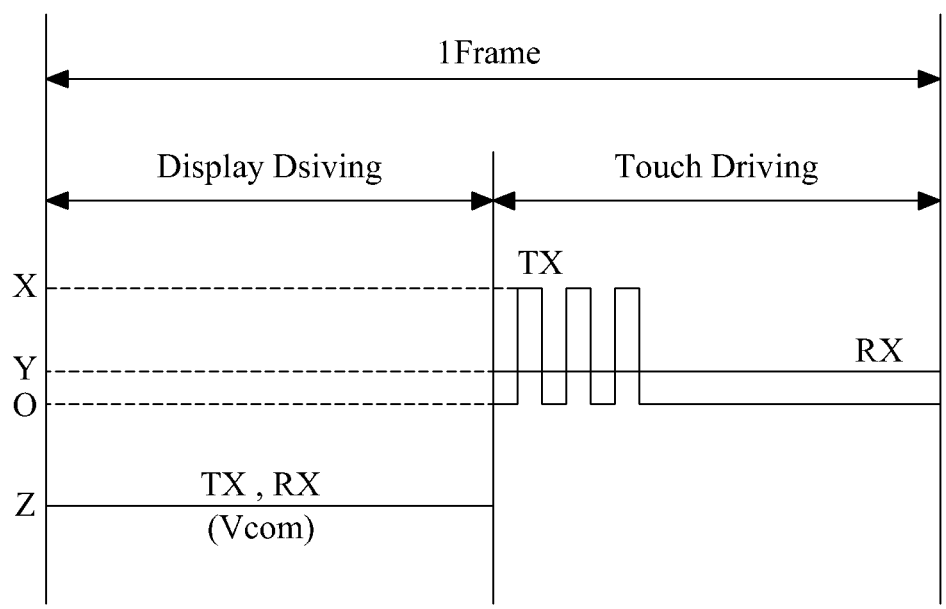
FIG. 1 is a timing chart showing voltages which may be respectively applied to a driving electrode and sensing electrode of a related art display device with an integrated touch screen.
Figure 2:
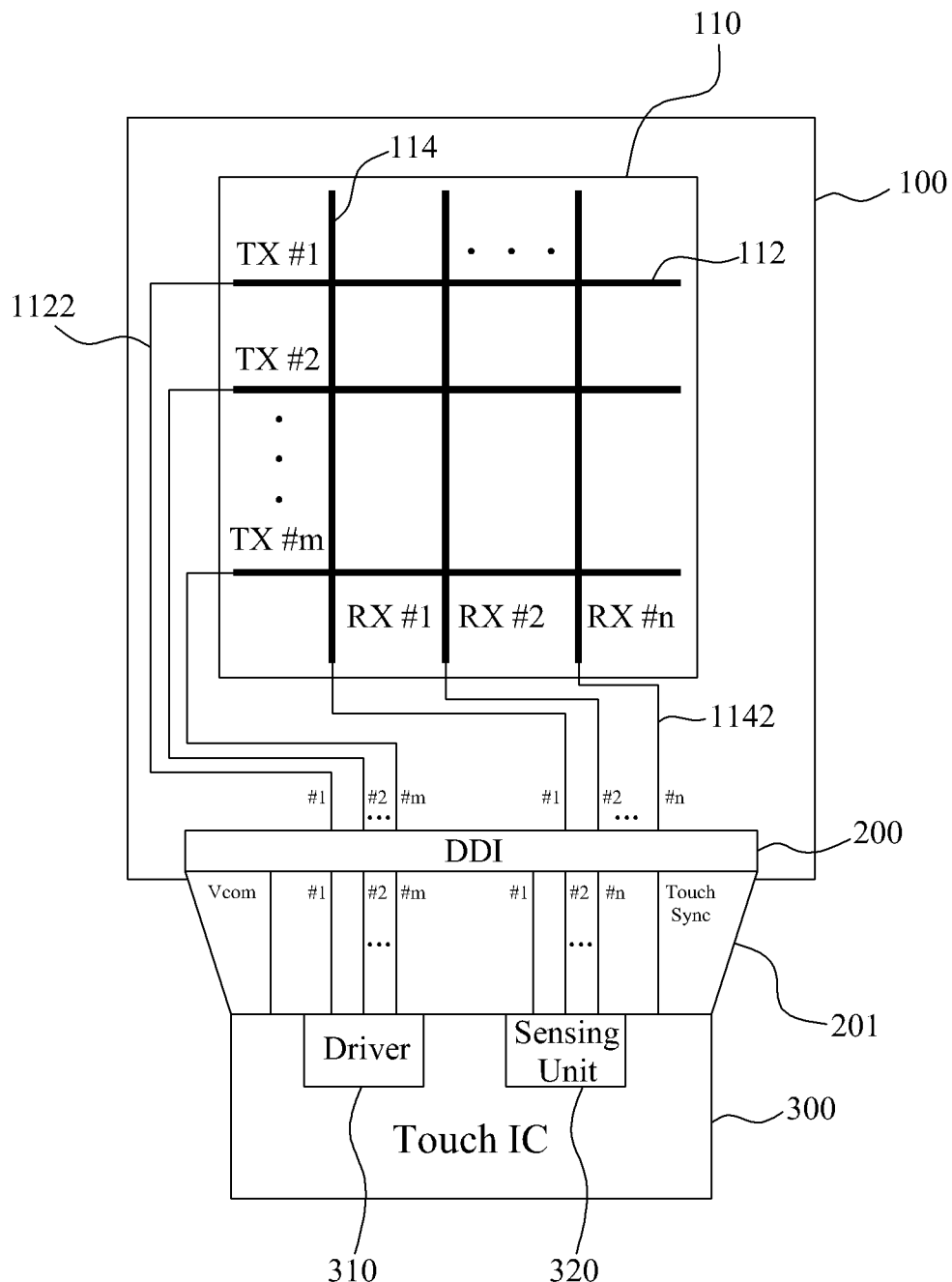
FIG. 2 is a diagram schematically illustrating an exemplary configuration of a display device with an integrated touch screen according to embodiments of the present invention.

FIG. 2 is a diagram schematically illustrating an exemplary configuration of a display device with an integrated touch screen according to embodiments of the present invention.

As illustrated in FIG. 2, the display device with an integrated touch screen may include a panel 100, a display driver IC 200, and a touch IC 300.

A touch screen 110 may be built in the panel 100. The touch screen 110 may include a plurality of driving electrodes 112 and a plurality of sensing electrodes 114.

The respective driving electrodes 112 may be connected to the display driver IC 200 through a plurality of driving electrode lines 1122, and the respective sensing electrodes 114 may be connected to the display driver IC 200 through a plurality of sensing electrode lines 1142.

In an embodiment, when the display device with the integrated touch screen is driven in a display mode, the driving electrodes 112 and the sensing electrodes 114 may perform the function of a common electrode. However, when the display device with integrated touch screen is driven in a touch mode, the driving electrodes 112 may perform the function of a touch driving electrode, and the sensing electrodes 114 may perform the function of a touch sensing electrode.

In other words, the driving electrodes and sensing electrodes of the display device with the integrated touch screen according to embodiments of the present invention may perform a touch function as well as a display function.

In an embodiment, the driving electrodes 112 may be formed in parallel in a width direction that may be the direction of a gate line (not shown) in the panel 100. Each of the sensing electrodes 114 may be disposed between adjacent sub driving electrodes among a plurality of sub driving electrodes (not shown), and formed in parallel in a height direction that may be the direction of a data line (not shown) in the panel 100.

For example, as illustrated in FIG. 2, the driving electrodes 112 may include first to mth driving electrodes TX#1 to TX#m, and each of the driving electrodes 112 may include n+1 number of sub driving electrodes (not shown). Also, the sensing electrodes 114 may include first to nth sensing electrodes RX#1 to RX#n. In order to configure one driving electrode, the sub driving electrodes (not shown) may be electrically connected to a plurality of driving electrode connection lines, respectively.

Each of the driving electrodes 112 may be formed as a plurality of block-type common electrodes that are formed to be overlapped with a plurality of unit pixel areas, and each of the sensing electrodes 114 may be formed as one block-type common electrode that is formed to be overlapped with the unit pixel areas.

The driving electrodes 112 and the sensing electrodes 114 may act as common electrodes for driving liquid crystal, and thus may be formed of a transparent material such as indium tin oxide (ITO).

When the panel 100 operates in the touch driving mode, the display drive IC 200 may apply a driving pulse to the driving electrodes 112, and may receive a plurality of sensing signals from the sensing electrodes 114. Meanwhile, when the panel 100 operates in the display driving mode, the display drive IC 200 may apply a common voltage Vcom to the driving electrodes 112 and the sensing electrodes 114.

Moreover, the display driver IC 200 may generate a gate control signal and a data control signal with a timing signal transmitted from an external system, and may realign input video data signals to be matched with the pixel structure of the panel 100, for outputting an image through the panel 100.

To this end, the display driver IC 200 may further include a gate driver that may apply a scan signal to a gate line, a data driver that may apply an image data signal to a data line, and a controller that may control the elements.

The touch IC 300 may generate a driving pulse and apply the driving pulse to the display driver IC 200, and may receive a sensing signal from the display driver IC 200 in order to determine whether there is a touch. To this end, the touch IC 300 may include a driver 310 and a sensing unit 320. Here, the touch IC 300 may be connected to the display driver IC 200 through a flexible printed circuit board (FPCB) 201.

The driver 310 of the touch IC 300 may generate the driving pulse and apply the driving pulse to the display driver IC 200, and may receive the sensing signal from the display driver IC 200 in order to determine whether there is a touch. Also, a touch sensing reference voltage Vref may be applied to the sensing unit 320, and the touch sensing reference voltage Vref may thereby be substantially applied to a sensing electrode by an operational amplifier included in the sensing unit 320. Therefore, the touch IC 300 may determine whether there is a touch according to the shift of a voltage with respect to the touch sensing reference voltage Vref, the shift of the voltage being caused by the change in a capacitance between a driving electrode and a sensing electrode due to a touch.

In an embodiment, the touch sensing reference voltage having the same level as that of the minimum voltage of the driving pulse may be applied to the sensing unit 320. As a result, when a voltage having the same level as that of the minimum voltage of the driving pulse is applied to the sensing unit 320, a voltage having the same level as that of the minimum voltage of the driving pulse may be applied to a sensing electrode.

For example, the level of the minimum voltage of the driving pulse applied to a driving electrode may be the same as that of the touch sensing reference voltage applied to a sensing electrode, for most of the duration (for example, all) of the touch driving mode session.

According to embodiments of the present invention, accordingly, the same voltage may be applied to a common electrode block which is used as a driving electrode, and a common electrode block that is used as a sensing electrode, during the touch driving mode session, and thus block dimming can be prevented in which a luminance difference may occurs between blocks in the panel 100.

In an embodiment, the level of the minimum voltage of the driving pulse and the level of the touch sensing reference voltage may be the same as that of the common voltage Vcom.

To this end, the driver 310 may generate the driving pulse (which may have a voltage having the same level as that of the common voltage Vcom as the minimum voltage) with the common voltage Vcom. Also, the touch sensing reference voltage Vref having the same level as that of the common voltage Vcom may be applied to the sensing unit 320.

For example, the level of the common voltage Vcom that is applied to a driving electrode and a sensing electrode during the display driving mode session may be the same as that of the minimum voltage of the driving pulse which is applied to the driving electrode during the touch driving mode session and that of the touch sensing reference voltage Vref which is applied to the sensing unit 320 during the touch driving mode session.

Accordingly, according to embodiments of the present invention, since the level of the common voltage that may be applied to a driving electrode and a sensing electrode during the display driving mode session may be the same as that of the minimum voltage of the driving pulse which is applied to the driving electrode during the touch driving mode session and that of the touch sensing reference voltage which is applied to the sensing electrode during the touch driving mode session, embodiments of the present invention can prevent flickers due to a difference between voltages that are respectively applied to a driving electrode and a sensing electrode between the display driving mode session and the touch driving mode session.

Hereinafter, embodiments of the display driver IC 200 and the touch IC 300 will be described in detail with reference to FIGS. 3 to 6.

Figure 3:
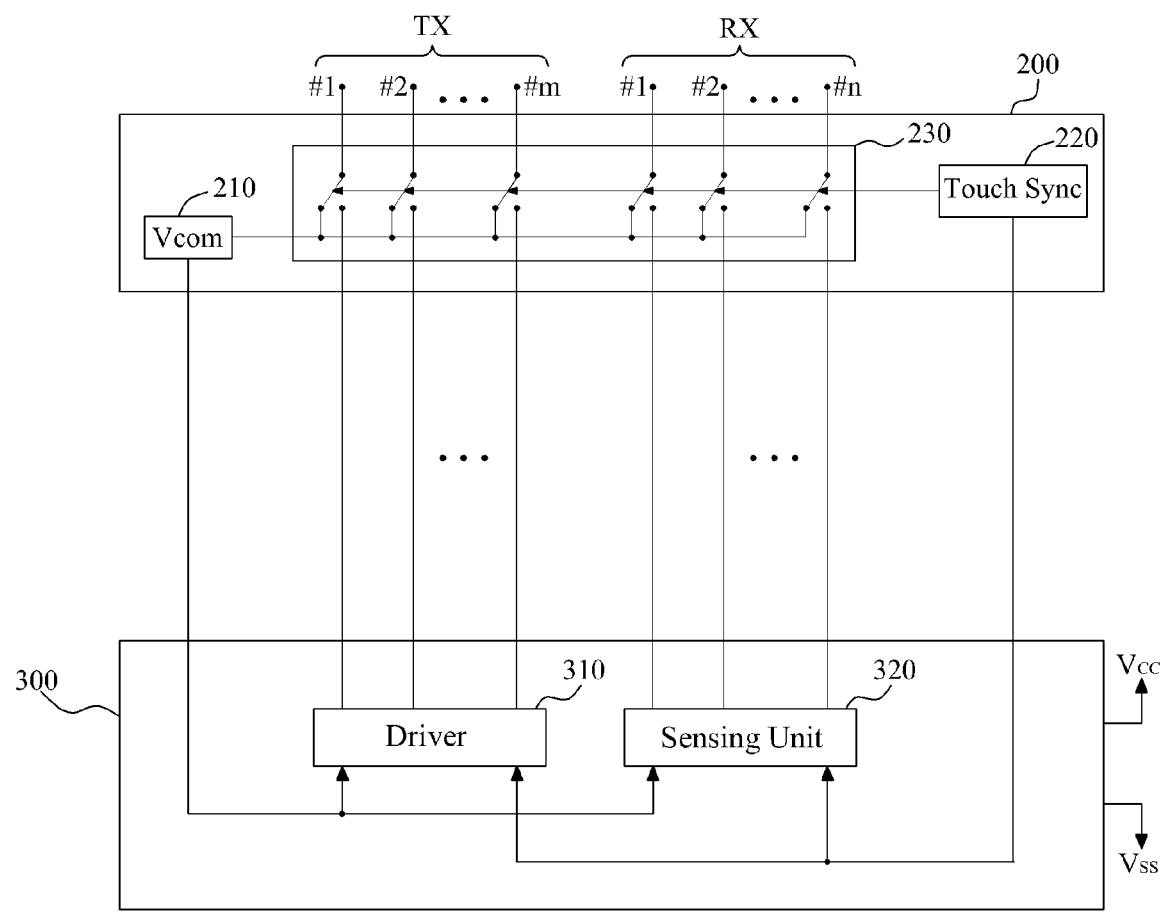
FIG. 3 is a diagram schematically illustrating an exemplary configuration of each of a display driver IC and a touch IC according to embodiments of the present invention.
Figure 4:
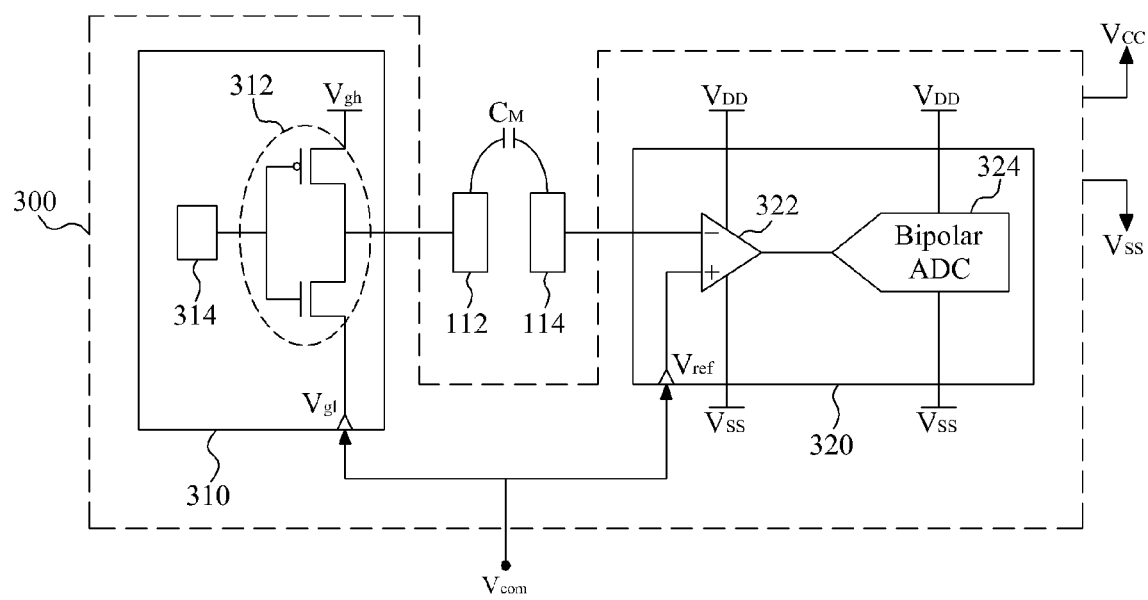
FIG. 4 is a diagram illustrating in detail an exemplary configuration of the touch IC of FIG. 3.
Figure 5:
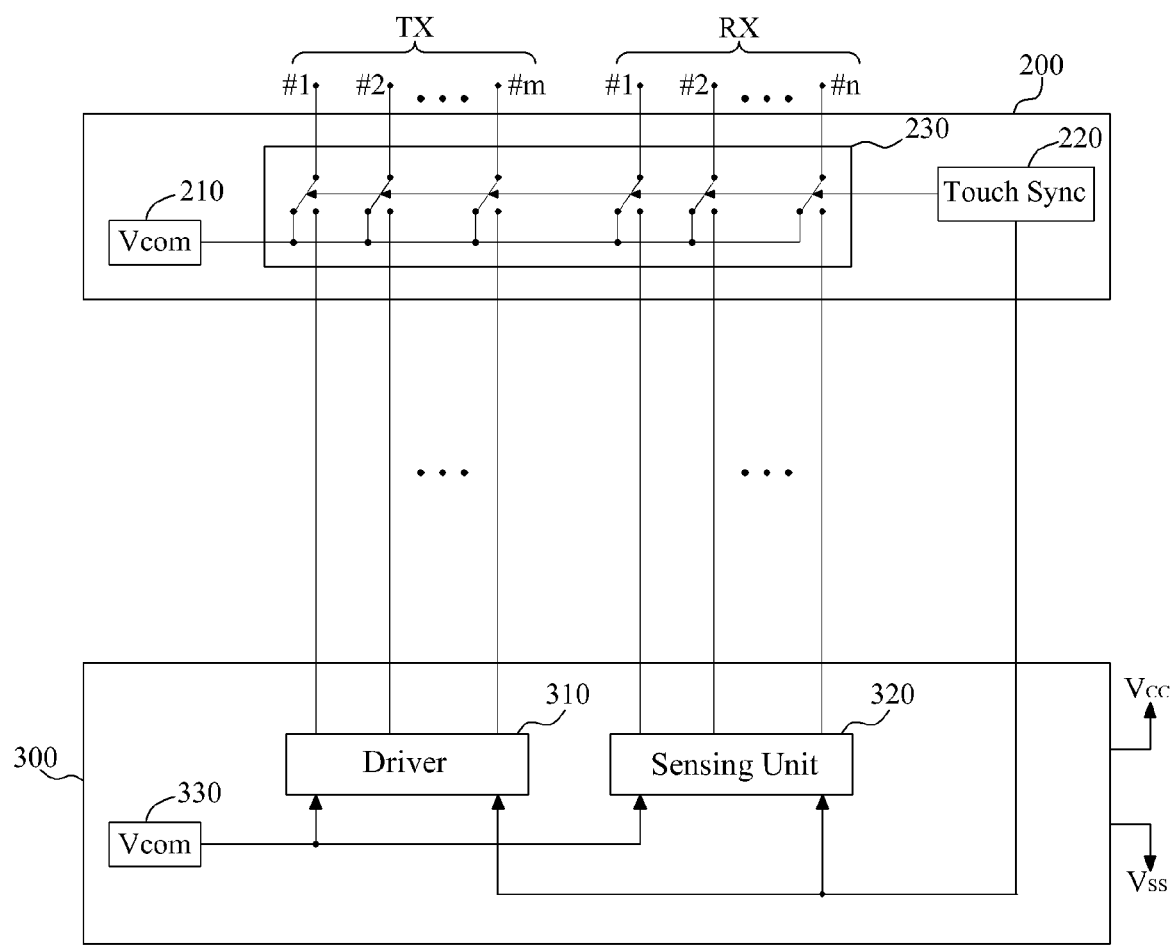
FIG. 5 is a diagram schematically illustrating an exemplary configuration of each of a display driver IC and a touch IC according to embodiments of the present invention.
Figure 6:
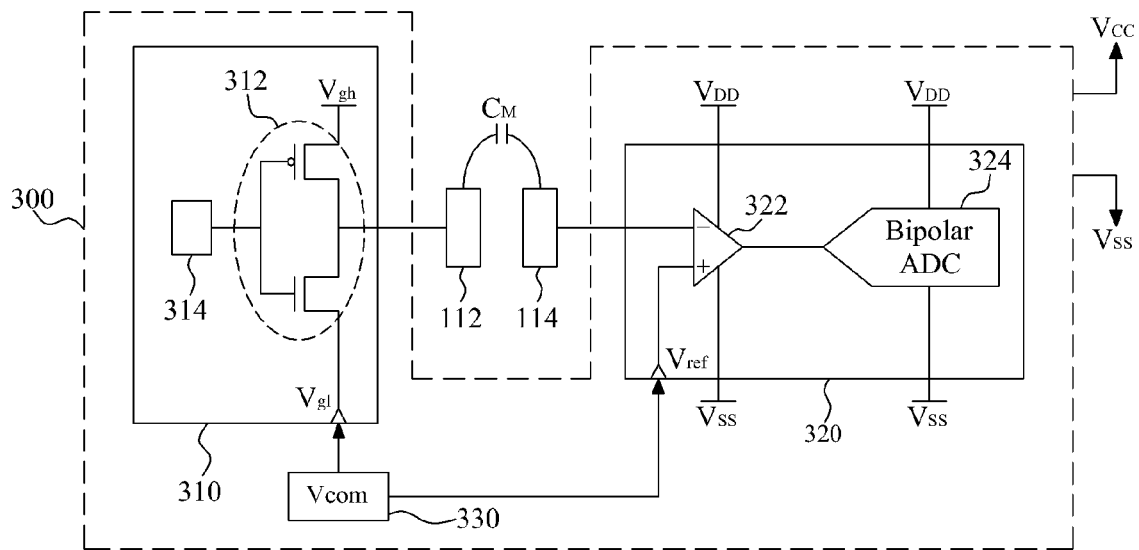
FIG. 6 is a diagram illustrating in detail an exemplary configuration of the touch IC of FIG. 5.

FIGS. 3 and 5 are diagrams schematically illustrating an exemplary configuration of each of a display driver IC and a touch IC according to embodiments of the present invention. FIG. 4 is a diagram illustrating in detail an exemplary configuration of the touch IC of FIG. 3. FIG. 6 is a diagram illustrating in detail an exemplary configuration of the touch IC of FIG. 5.

The display driver IC 200, as illustrated in FIGS. 3 and 5, may include a common voltage generator 210, a sync signal generator 220, and a switching unit 230.

The common voltage generator 210 may output the common voltage Vcom for driving liquid crystal to the switching unit 230.

The sync signal generator 220 may generate a sync signal "Touch Sync" that may indicate the driving mode of the panel 100. The sync signal may include a first sync signal that indicates the display driving mode, and a second sync signal that indicates the touch driving mode.

For example, the sync signal generator 220 may generate the first sync signal that indicates the display driving mode, and may output the first sync signal to the switching unit 230 at an image output time for which the panel 100 operates in the display driving mode. The sync signal generator 220 may generate the second sync signal that indicates the touch driving mode, and may output the second sync signal to the switching unit 230 at a touch sensing time for which the panel 100 operates in the touch driving mode.

When the first sync signal is inputted to the switching unit 230, the switching unit 230 may electrically connect the common voltage generator 210 to the plurality of driving electrodes and sensing electrodes, and thus, the common voltage Vcom may be applied to the plurality of driving electrodes and sensing electrodes. Also, when the second sync signal is inputted, the switching unit 230 may electrically connect the driver 310 to the driving electrodes and may connect the sensing unit 320 to the sensing electrodes, and thus, the driving pulse may be applied to the driving electrodes, while a plurality of sensing signals may be received from the sensing electrodes.

The touch IC 300, as illustrated in FIGS. 3 and 4, may receive the common voltage Vcom from outside the touch IC 300. Alternatively, as illustrated in FIGS. 5 and 6, the common voltage Vcom may be generated inside the touch IC 300.

For example, as illustrated in FIGS. 3 and 4, the common voltage Vcom that may be generated by the common voltage generator 210 of the display driver IC 200 (e.g., outside the touch IC 300) may be applied to the driver 310 and sensing unit 320 of the touch IC 300. Alternatively, as illustrated in FIGS. 5 and 6, the common voltage Vcom that may be generated by the common voltage generator 330 of the touch IC 300 (e.g., inside the touch IC 300) may be applied to the driver 310 and sensing unit 320 of the touch IC 300.

In an embodiment, the driver 310 may output the driving pulse, which has a minimum voltage having the same level as that of the common voltage Vcom, to the switching unit 230 of the display driver IC 200. Also, the touch sensing reference voltage Vref having the same level as that of the common voltage Vcom may be applied to the sensing unit 320 for determining whether there is a touch. Thus, the common voltage Vcom may be applied as the touch sensing reference voltage Vref to a sensing electrode.

In an embodiment, the driver 310 and the sensing unit 320 may operate according to the sync signal "Touch Sync" generated by the sync signal generator of the display driver IC 200.

For example, when the second sync signal indicating the touch driving mode is inputted, the driver 310 may generate and output the driving pulse to the switching unit 320, and the sensing unit 320 may receive a sensing signal from a sensing electrode to sense whether there is a touch.

In an embodiment, the driver 310 may include a driving pulse generator 312 and a driving pulse generation controller 314 that correspond to each of the plurality of driving electrodes 112, and the sensing unit 320 may include an operational amplifier 322 and a bipolar analog-to-digital converter (ADC) 324 that correspond to each of the plurality of sensing electrodes 114.

For example, as illustrated in FIGS. 4 and 6, the driving pulse generator 312 of the driver 310 is connected to the driving electrode 112. Here, the driving pulse generator 312 may be provided in correspondence with a plurality of driving electrodes; for convenience, FIGS. 4 and 6 illustrate only the driving pulse generator 312 connected to one driving electrode.

The driving pulse generator 312 may generate a driving pulse having a maximum voltage Vgh and a minimum voltage Vgl according to a control signal outputted from the driving pulse generation controller 314. To this end, the driving pulse generator 312 may include a CMOS transistor that is configured with a PMOS transistor and an NMOS transistor. Accordingly, when the minimum voltage Vgl is the common voltage Vcom, the driving pulse generator 312 may generate a driving pulse having the common voltage as the minimum voltage.

As illustrated in FIGS. 4 and 6, the operational amplifier 322 of the sensing unit 320 may be connected to the sensing electrode 114. Here, the operational amplifier 322 may be formed in correspondence with a plurality of sensing electrodes; for convenience, FIGS. 4 and 6 illustrate only the operational amplifier 322 connected to one sensing electrode.

The operational amplifier 322 may include a non-inverting input terminal that receives the touch sensing reference voltage Vref, an inverting input terminal that is connected to one of the sensing electrodes, and an output terminal that is connected to the bipolar ADC 324. For example, when the touch sensing reference voltage Vref is applied to the non-inverting input terminal of the operational amplifier 322, the inverting input terminal and the non-inverting input terminal may form a virtual ground according to the operational characteristic of the operational amplifier 322, and thus, the touch sensing reference voltage Vref may be substantially applied to the sensing electrode 114.

Therefore, when the touch sensing reference voltage Vref is the common voltage Vcom, the common voltage Vcom is applied to the inverting input terminal of the operational amplifier 322, and the common voltage Vcom is substantially applied to the sensing electrode 114.

Furthermore, although the driving electrode 112 may not be electrically connected to the sensing electrode 114, the change in a mutual capacitance $C_M$ between the driving electrode 112 and the sensing electrode 114 may occur from the driving pulse applied to the driving electrode 112. The operational amplifier 322 may integrate the change in the mutual capacitance and output the integrated result as a voltage to the bipolar ADC 324, or may transfer the change in the mutual capacitance as a voltage to the bipolar ADC 324.

The bipolar ADC 324 may convert the voltage outputted from the operation amplifier 322 into a digital code. Also, the sensing unit 320 may include a touch analyzer (not shown) that analyzes the digital code outputted from the bipolar ADC 324 and corresponds to the change in the mutual capacitance, in order to determine whether there is a touch.

In an embodiment, the touch IC 300 may receive bipolar source voltages. For example, as illustrated in FIGS. 3-6, the touch IC 300 may receive bipolar source voltages $V_{CC}$ and $V_{SS}$. Here, $V_{CC}$ is a positive source voltage, and $V_{SS}$ is a negative source voltage. This is because a negative common voltage may not be applied when only the positive source voltage $V_{CC}$ is applied to the touch IC 300, and thus, when the bipolar source voltages are applied to the touch IC 300, the touch IC 300 may be unable to use a negative common voltage.

Moreover, similar to the touch IC 300, the operational amplifier 322 and the bipolar ADC 324 may receive bipolar source voltages $V_{DD}$ and $V_{SS}$. Here, $V_{DD}$ may be a positive source voltage that is generated inside the touch IC 300 with the positive source voltage $V_{CC}$ applied to the touch IC 300. This is because the operational amplifier 322 and the bipolar ADC 324 may operate within the range of an input source voltage, and thus, when a negative common voltage is applied as the touch sensing reference voltage Vref, the bipolar source voltages may be applied to the operational amplifier 322 and the bipolar ADC 324 for operation.

In another embodiment (although not shown), the touch IC 300 may receive a unipolar source voltage. For example, the touch IC 300 may receive the positive source voltage $V_{CC}$ and a ground voltage.

As described above, the display device with an integrated touch screen according to embodiments of the present invention may use an equal voltage for the common voltage, the minimum voltage of the driving pulse, and the touch sensing reference voltage.

For example, when the common voltage uses a negative voltage, the minimum voltage of the driving pulse uses the ground voltage, or the touch sensing reference voltage uses a positive voltage that has a level equal to half of the level of the positive source voltage $V_{DD}$ applied to the operation amplifier, the display device with the integrated touch screen according to embodiments of the present invention may use a same one voltage for each of the common voltage, the minimum voltage of the driving pulse, and the touch sensing reference voltage—i.e., the levels of these voltages may be made identical. Accordingly, other voltages may be changed with respect to the common voltage, the minimum voltage of the driving pulse, and the touch sensing reference voltage.

Hereinafter, embodiments in which other voltages are changed with respect to the common voltage, the minimum voltage of the driving pulse, and the touch sensing reference voltage will be described in detail with reference to FIGS. 7 to 9.

Figure 7:
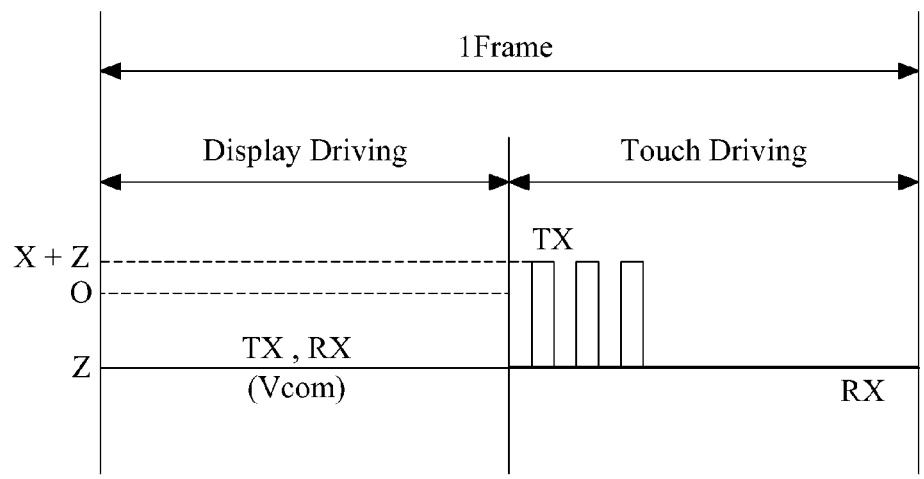
FIGS. 7 to 9 are timing charts showing voltages which may be respectively applied to a driving electrode and sensing electrode of a display device with an integrated touch screen according to embodiments of the present invention.
Figure 8:
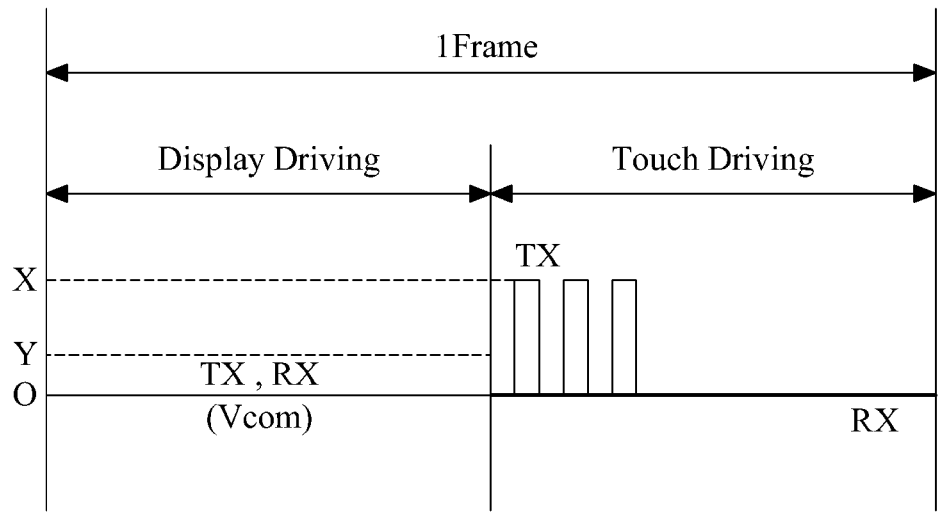
Figure 9:
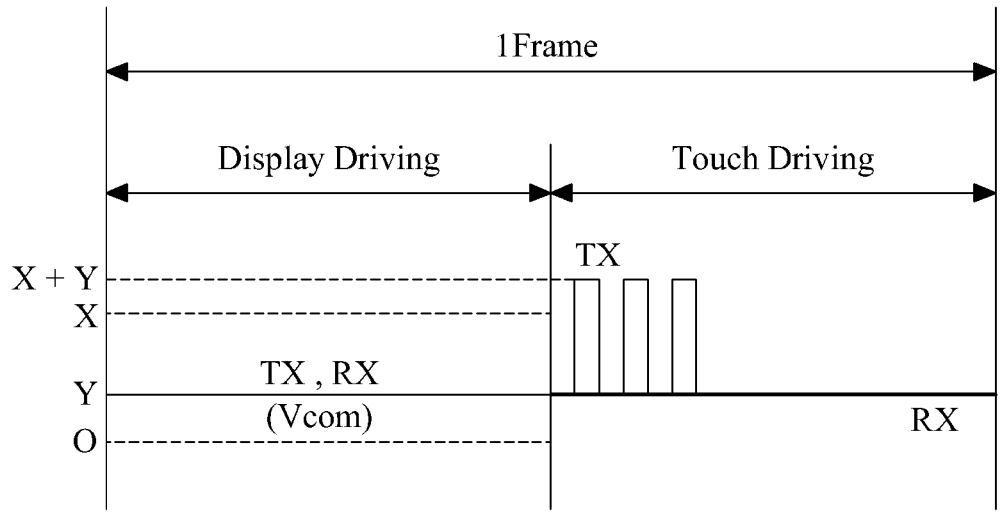

FIGS. 7 to 9 are timing charts showing voltages which may be applied to a driving electrode and sensing electrode of a display device with an integrated touch screen according to embodiments of the present invention, respectively. Specifically, FIG. 7 is a timing chart showing voltages which may be applied with respect to the negative common voltage, FIG. 8 is a timing chart showing voltages which may be applied with respect to the minimum voltage of the driving pulse that is the ground voltage, and FIG. 9 is a timing chart showing voltages which may be applied with respect to the touch sensing reference voltage that is a positive voltage.

Here, a driving electrode TX and a receiving electrode RX that are built into the panel 100 may perform the function of a common electrode and the function of a touch electrode, and thus, the display device with an integrated touch screen according to embodiments of the present invention may divide time and performs time-division driving according to the display driving mode and the touch driving mode.

Therefore, as illustrated in FIGS. 7 to 9, one frame in time-division driving may be divided into the display driving mode session (in which the panel 100 operates in the display driving mode according to the sync signal) and the touch driving mode session (in which the panel 100 operates in the touch driving mode according to the sync signal). In this case, touch driving may be turned off in the display driving mode session, and display driving may be turned off in the touch driving mode session, thus minimizing signal interference between the display driving mode session and the touch driving mode session.

As illustrated in FIG. 7, when the common voltage is a negative common voltage Z(V), the common voltage Z(V) may be applied to both a driving electrode TX and a sensing electrode RX in the display driving mode session, and in the touch driving mode session, a driving pulse having the minimum voltage Z(V) may be applied to the driving electrode TX, and a touch sensing reference voltage Z(V) may be applied to the sensing electrode RX.

As illustrated in FIG. 8, when the minimum voltage of a driving pulse is a ground voltage 0(V), a common voltage 0(V) may be applied to both the driving electrode TX and the sensing electrode RX in the display driving mode session, and in the touch driving mode session, the driving pulse having the minimum voltage 0(V) may be applied to the driving electrode TX, and a touch sensing reference voltage 0(V) may be applied to the sensing electrode RX.

As illustrated in FIG. 9, when a touch sensing reference voltage is a positive voltage Y(V), a common voltage Y(V) may be applied to both the driving electrode TX and the sensing electrode RX in the display driving mode session, and in the touch driving mode session, a driving pulse having a minimum voltage Y(V) may be applied to the driving electrode TX, and the touch sensing reference voltage Y(V) may be applied to the sensing electrode RX.

Accordingly, by making the level of the common voltage Vcom, the level of the minimum voltage Vgl of the driving pulse, and the level of the touch sensing reference voltage Vref identical, the display device with an integrated touch screen according to embodiments of the present invention can prevent block dimming due to a difference between voltages respectively applied to a driving electrode and a sensing electrode when the panel is in the touch driving mode session, and can prevent flickers due to a difference between voltages respectively applied to the driving electrode and the sensing electrode in the touch driving mode session and the display driving mode session.

According to embodiments of the present invention, a function that generates a compensation common voltage and switches the compensation common voltage may be built into the touch IC. Accordingly, in display devices with an integrated in-cell type touch screen, a common voltage compensation circuit can be easily implemented, a circuit may be stabilized, and cost can be saved by the integration of the compensation circuit.

It will be apparent to those skilled in the art that various modifications and variations can be made in embodiments of the present invention without departing from the spirit or scope of the invention. Thus, it is intended that the present invention covers the modifications and variations of this invention provided they come within the scope of the appended claims and their equivalents.

What is claimed is:

1. A display device with an integrated touch screen, comprising:
    a panel having a plurality of driving electrodes and sensing electrodes;
    a display driver IC configured to apply a driving pulse to the plurality of driving electrodes and receive a plurality of sensing signals from the sensing electrodes when the panel operates in a touch driving mode, and configured to apply a common voltage to the plurality of driving electrodes and sensing electrodes when the panel operates in a display driving mode; and
    a touch IC configured to generate the driving pulse and apply the driving pulse to the display driver IC, receive the sensing signals from the display driver IC, and determine whether there is a touch,
    wherein the touch IC includes a sensing unit configured to sense whether there is a touch by use of a touch sensing reference voltage applied to the sensing unit and having the same level as a minimum voltage of the driving pulse.

2. The display device according to claim 1, wherein the common voltage has the same level as the touch sensing reference voltage and the minimum voltage of the driving pulse.

3. The display device according to claim 1, wherein the display driver IC includes a switching unit, the touch IC is configured to generate and output the driving pulse to the display driver IC, and the display driver IC is configured to apply the driving pulse received from the touch IC to the switching unit.

4. The display device according to claim 3, wherein when the switching unit receives a first sync signal indicating the display driving mode, the switching unit connects the common voltage to the driving electrodes and the sensing electrodes.

5. The display device according to claim 3, wherein when the switching unit receives a second sync signal indicating the touch driving mode, the switching unit connects the driving pulse received from the touch IC to the driving electrodes and connects the sensing unit in the touch IC to the sensing electrodes, whereby the driving pulse is applied to the driving electrodes and the plurality of sensing signals are received by the sensing unit from the sensing electrodes.

6. The display device according to claim 1, wherein the common voltage is generated inside the display driver IC or is inputted from outside the display driver IC.

7. The display device according to claim 2, wherein the common voltage is a negative voltage.

8. The display device according to claim 2, wherein the common voltage is a ground voltage.

9. The display device according to claim 2, wherein the common voltage is a positive voltage.

10. The display device according to claim 1, wherein the touch IC receives bipolar power source voltages Vcc and Vss.

11. The display device according to claim 10, wherein Vcc is a positive power source voltage and Vss is a negative power source voltage.

12. A method of driving a display device with an integrated touch screen, the touch screen including a display driver IC, a touch IC, and a panel having a plurality of driving electrodes and sensing electrodes, comprising:
while the panel operates in a touch driving mode, the display driver IC applying a driving pulse to the driving electrodes and receiving a plurality of sensing signals from the sensing electrodes, and the touch IC receiving the plurality of sensing signals from the display driver IC and determining whether there is a touch; and
while the panel operates in a display driving mode, the display driver IC applying a common voltage to the plurality of driving electrodes and sensing electrodes, wherein the touch IC is configured to sense whether there is a touch by use of a touch sensing reference voltage having the same level as a minimum voltage of the driving pulse.

13. The method of claim 12, wherein the touch IC includes a sensing unit, the sensing unit being configured to sense whether there is a touch, and the touch sensing reference voltage having the same level as the minimum voltage of the driving pulse being applied to the sensing unit.

14. The method of claim 12, wherein the display driver IC includes a switching unit, and the touch IC further includes a driver configured to generate and output the driving pulse to the switching unit.

15. The method of claim 14, further comprising:
the switching unit receiving a first sync signal to indicate the display driving mode.

16. The method of claim 14, further comprising:
the switching unit receiving a second sync signal to indicate the touch driving mode.

17. The method of claim 12, wherein the common voltage has the same level as the touch sensing reference voltage and the minimum voltage of the driving pulse.

18. The method of claim 17, wherein the common voltage is a positive voltage, a ground voltage, or a negative voltage.

19. The method of claim 12, wherein the touch IC receives bipolar power source voltages Vcc and Vss.

20. The method of claim 19, wherein Vcc is a positive power source voltage and Vss is a negative power source voltage.

* * * * *